United States Patent
Hoogerwerf et al.

(10) Patent No.: US 11,132,333 B2
(45) Date of Patent: Sep. 28, 2021

(54) FILE ACCESS WITH DIFFERENT FILE HOSTS

(71) Applicant: Microsoft Technology Licensing, LLC, Redmond, WA (US)

(72) Inventors: Scott D. Hoogerwerf, Seattle, WA (US); David C. Fields, Kirkland, WA (US); Michael J. Gilmore, Bothell, WA (US); Rolf A. Ebeling, Kirkland, WA (US); Steven J. Ball, Redmond, WA (US); Manav Mishra, Kirkland, WA (US); Tyler K. Beam, Redmond, WA (US); Robert H. Liao, Bellevue, WA (US); Benjamin J. Karas, Seattle, WA (US); Matthew P. Duignan, Seattle, WA (US); Jensen Harris, Bellevue, WA (US); Richard Jacob White, Seattle, WA (US); Lyon Wong, Issaquah, WA (US); Dennis L. Davis, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/927,117

(22) Filed: Jul. 13, 2020

(65) Prior Publication Data

US 2020/0356527 A1  Nov. 12, 2020

Related U.S. Application Data

(63) Continuation of application No. 16/018,890, filed on Jun. 26, 2018, now abandoned, which is a
(Continued)

(51) Int. Cl.
*G06F 3/048* (2013.01)
*G06F 16/13* (2019.01)
(Continued)

(52) U.S. Cl.
CPC ............ *G06F 16/13* (2019.01); *G06F 3/0481* (2013.01); *G06F 3/04842* (2013.01);
(Continued)

(58) Field of Classification Search
CPC .......... G06F 16/13; G06F 9/451; G06F 16/16; G06F 16/168; G06F 3/0481; G06F 3/04842; G06F 12/0292; G06F 17/18
See application file for complete search history.

(56) References Cited

U.S. PATENT DOCUMENTS 9,473,562 B2 * 10/2016 Rahardja ................. G06F 9/546
9,965,134 B2 *  5/2018 Lynch .................... G06F 3/0481
(Continued)

*Primary Examiner* — David Phantana-angkool
(74) *Attorney, Agent, or Firm* — Rainier Patents, P.S.

(57) ABSTRACT

A file access request is received from an application. One or more file types for the file access request are identified, and one or more file hosts supporting files of the identified one or more file types are also identified. A user interface is displayed, the user interface including a hosted area. Within the hosted area, at least one of the one or more file hosts displays a portion of the user interface identifying one or more files of at least one file host that can be selected for retrieval, or one or more locations that can be selected to which the one or more files are saved.

20 Claims, 8 Drawing Sheets

Related U.S. Application Data continuation of application No. 14/323,841, filed on Jul. 3, 2014, now Pat. No. 10,042,851, which is a continuation of application No. 13/117,598, filed on May 27, 2011, now Pat. No. 8,819,586.

(51) Int. Cl.

| | | |
|---|---|---|
| *G06F 16/10* | (2019.01) | |
| *G06F 16/16* | (2019.01) | |
| *G06F 9/451* | (2018.01) | |
| *G06F 12/02* | (2006.01) | |
| *G06F 17/18* | (2006.01) | |
| *G06F 3/0481* | (2013.01) | |
| *G06F 3/0484* | (2013.01) | |

(52) U.S. Cl.
CPC .......... *G06F 9/451* (2018.02); *G06F 12/0292* (2013.01); *G06F 16/10* (2019.01); *G06F 16/16* (2019.01); *G06F 16/168* (2019.01); *G06F 17/18* (2013.01)

(56) References Cited

U.S. PATENT DOCUMENTS

| | | | |
|---|---|---|---|
| 10,365,798 B1 * | 7/2019 | El Kaissi | G06F 3/0484 |
| 11,010,800 B2 * | 5/2021 | Norman | G06Q 30/06 |
| 2018/0322136 A1 * | 11/2018 | Carpentier | G06F 9/452 |

\* cited by examiner

FILE ACCESS WITH DIFFERENT FILE HOSTS

RELATED APPLICATION

This application is a continuation of and claims priority to U.S. patent application Ser. No. 14/323,841 filed Jul. 3, 2014, which is a continuation of and claims priority to U.S. patent application Ser. No. 13/117,598 filed May 27, 2011, the disclosures of which are incorporated by reference herein in their entirety.

BACKGROUND

Users oftentimes have a variety of different files of interest to them, such as document files, image files, music files, video files, and so forth. These files can be stored on various storage devices, such as on a hard drive of the user's computer or on a server over a network. Tracking these files across such storage devices, however, can be cumbersome on the user, oftentimes requiring the user to access those various storage devices from each application with which he or she desires to use the files and keep track of which storage devices have which files.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a file access request is received from an application. One or more file types for the file access request are identified, and one or more file hosts supporting files of the identified one or more file types are also identified. A user interface is displayed, the user interface including a hosted area. Within the hosted area, at least one of the one or more file hosts displays a portion of the user interface identifying one or more files of the at least one file host that can be selected for retrieval.

In accordance with one or more aspects, a file access request is received from an application. A file type of a file to be saved by the application is identified, and one or more file hosts supporting files of the identified file type are also identified. A user interface is displayed, the user interface including a hosted area. Within the hosted area, at least one of the one or more file hosts displays a portion of the user interface allowing the file to be saved by the at least one file host.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

File access with different file hosts is discussed herein. When using an application, a user can retrieve files maintained by various file hosts, such as file systems, other applications, service providers, and so forth. Similarly, a user can save files to various file hosts. A user interface (UI) having a hosted area is displayed, and various file hosts can display a user interface within the hosted area. Each file host can tailor the display within the hosted area as the file host desires. By interacting with the user interface displayed in this hosted area, the user can select files from the various file hosts for retrieval into the application he or she is using, and/or select a destination file host to which a file is to be saved.

In the following discussion, an example system is first described that is operable to perform techniques described herein. Example procedures are then described, which are operable in the example system as well as in other systems. Likewise, the example system is not limited to performance of the example procedures.

Example System

Figure 1:
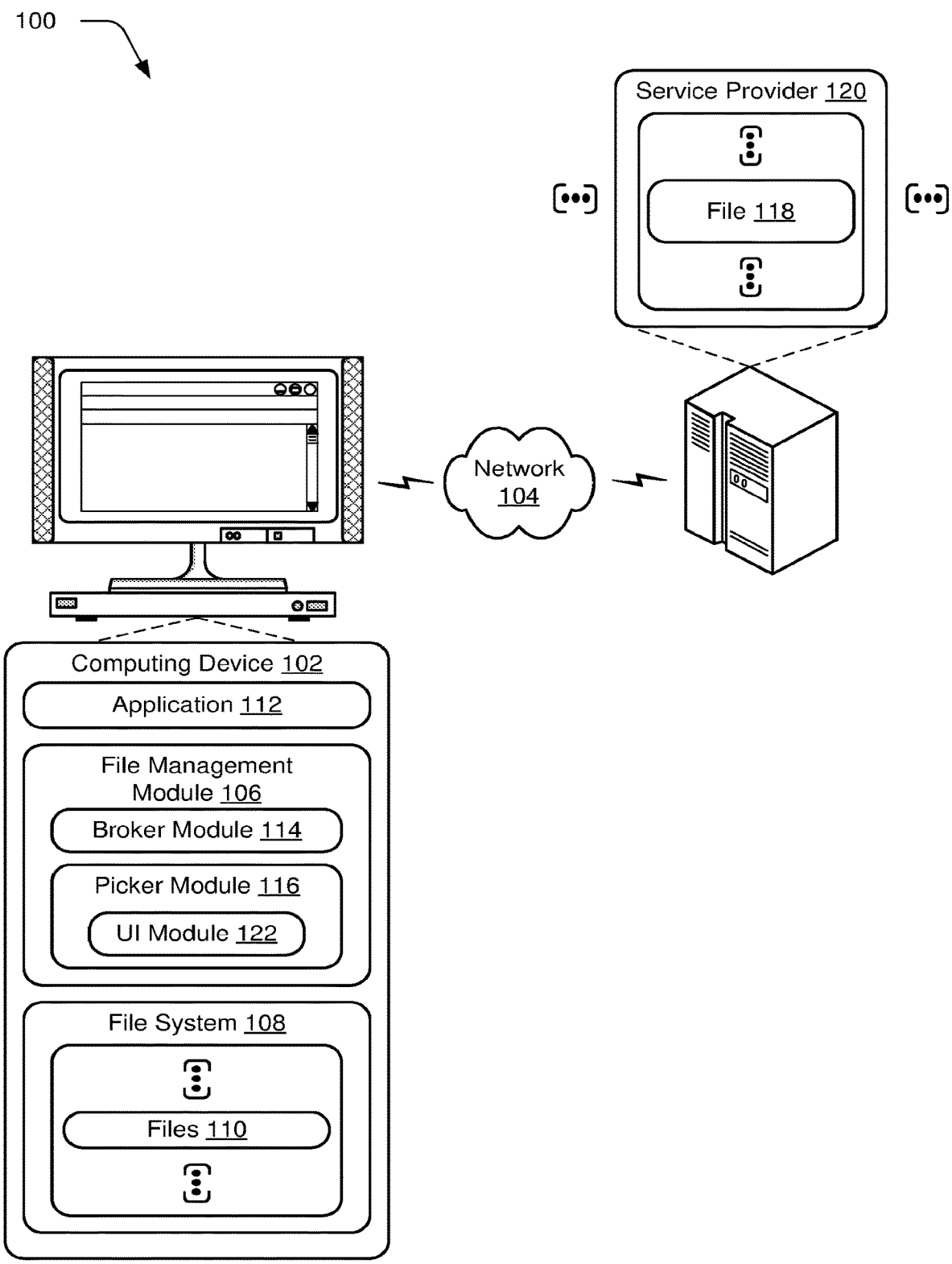
FIG. 1 illustrates an example system implementing the file access with different file hosts techniques discussed herein in accordance with one or more embodiments.

FIG. 1 illustrates an example system 100 implementing the file access with different file hosts techniques discussed herein in accordance with one or more embodiments. The illustrated system 100 includes a computing device 102, which may be configured in a variety of ways. For example, computing device 102 can be configured as a computer that is capable of communicating over a network 104, such as a desktop computer, a tablet or notepad computer, a mobile station, an entertainment appliance, a set-top box communicatively coupled to a display device, a television or other display device, a cellular or other wireless phone, a game console, and so forth.

Computing device 102 may range from a full resource device with substantial memory and processor resources (e.g., personal computers, game consoles) to a low-resource device with limited memory and/or processing resources (e.g., traditional set-top boxes, hand-held game consoles). Additionally, although a single computing device 102 is shown, computing device 102 may be representative of multiple different devices, such as multiple servers utilized by a business to perform operations, a remote control and set-top box combination, an image capture device (e.g., camera) and a game console configured to capture gestures, and so on.

Computing device 102 can also include an entity (e.g., software) that causes hardware of the computing device 102 to perform operations, e.g., configures processors, functional blocks, and so on. For example, computing device 102 may include a computer-readable medium that may be configured to maintain instructions that cause the computing device, and more particularly hardware of computing device 102 to perform operations. Thus, the instructions function to configure the hardware to perform the operations and in this way result in transformation of the hardware to perform the operations. The instructions may be provided by the computer-readable medium to computing device 102 through a variety of different configurations.

One such configuration of a computer-readable medium is signal bearing medium and thus is configured to transmit the instructions (e.g., as a carrier wave) to the hardware of the computing device, such as via network 104. The computer-readable medium may also be configured as a computer-readable storage medium and thus is not a signal bearing medium. Examples of a computer-readable storage medium include a random-access memory (RAM), read-only memory (ROM), optical discs (e.g., DVD or CD), flash memory, hard disk memory, and other memory devices that may use magnetic, optical, and other techniques to store instructions and other data.

Network 104 can assume a variety of different configurations. For example, network 104 can include the Internet, a wide area network (WAN), a local area network (LAN), a personal area network (PAN), a wireless network, a public telephone network, an intranet, combinations thereof, and so on. Further, although a single network 104 is shown, network 104 may be configured to include multiple networks.

Computing device 102 is illustrated as including a file management module 106. File management module 106 is representative of functionality to manage access to one or more files, including files in a file system 108. File management module 106 can be implemented in a variety of ways, such as a stand-alone application, as part of an operating system of computing device 102, as an application that executes in conjunction with the operating system, and so on.

File system 108 employs techniques to organize and store files 110 by computing device 102. File system 108, for instance, can employ a hierarchy of folders to manage files 110 (e.g., executable and/or library files) in storage. A variety of other file management techniques that may be employed by file management module 106 and file system 108 are contemplated. Additionally, a variety of different types of files 110 can be managed using file management module 106. For example, files 110 can be text (document) files, image files, video files, audio files, combinations thereof, and so forth.

An application 112 is one or more programs, scripts, or other collections of instructions that run on computing device 102. Application 112 can assume a variety of different configurations, such as an entertainment application (e.g., a game or audio/video player), a utility application (e.g., a word processor or Web browser), a reference application (e.g., a dictionary or encyclopedia), and so forth. Application 112 can be one or more programs, scripts, or other collections of instructions that run on computing device 102 and can be stored as files 110. Alternatively, application 112 can be one or more programs, scripts, or other collections of instructions that are downloaded from a remote service (e.g., via network 104) and run on computing device 102 without being stored as files 110. Or, application 112 can be one or more programs, scripts, or other collections of instructions that are run on a remote service, with a user interface generated by the remote service and provided (e.g., via network 104) to computing device 102 for display, and inputs received at computing device 102 being returned (e.g., via network 104) to the remote service for processing.

In one or more embodiments, application 112 is an isolated application, being run in a manner in which the ability of application 112 to access resources (e.g., networked computers, the Internet, modules, devices, memory, other applications) of computing device 102 is restricted. The operating system (and/or other software, firmware, and/or hardware) of computing device 102 allows an isolated application to access memory and other resources of computing device 102 that have been allocated or otherwise made available to the isolated application, but prevents the isolated application from accessing other memory of, resources of, and/or applications running on computing device 102. This protects other applications running on computing device 102 from being interfered with by the isolated application, as well as protects the isolated application from being interfered with by other applications running on computing device 102, thus isolating the application from other applications on computing device 102.

In one or more embodiments, application 112 is run in a restricted manner by being run in a sandbox. Although a single application 112 is illustrated in computing device 102, it should be noted that multiple applications can be running in computing device 102 concurrently (each application being executed in its own sandbox).

File management module 106 is further illustrated as including a broker module 114 and a picker module 116. Broker module 114 is representative of functionality of file management module 106 to manage access of application 112 to various file hosts, such as file system 108, other applications, service providers, and so forth. Broker module 114, for instance, may act as an intermediary to locate files requested by application 112 and provide those files back to application 112. Further, such files may be provided to application 112 and application 112 need not be aware of where the files were obtained (e.g., the namespace used by file system 108, the host, and so forth). For example, broker module 114 can operate as an abstraction layer that isolates application 112 from specific details regarding various file hosts and the manner in which those file hosts store files.

Additionally, broker module 114 may employ picker module 116 to configure a user interface such that a user may select files from various file hosts. Picker module 116 includes a UI module 122 managing communication with file hosts as appropriate, including managing remote access (e.g., with service provider 120 over network 104). UI module 122 also manages at least a portion of a user interface based on communications with other file hosts. For example, UI module 122 can configure a portion of a user interface such that a user can select remote files that are accessible via a service provider 120 (e.g., implemented using one or more computing devices) over network 104, select remote files that are managed by an application of service provider 120, select files that are managed by other applications on computing device 102, and so forth.

Various modules and applications of computing device 102, such as application 112 and picker module 116, can receive user inputs from a user of computing device 102. These user inputs can provide data, user selections, and so forth. User inputs can be provided in a variety of different manners, such as by pressing one or more keys of a keypad or keyboard of device 102, pressing one or more keys of a controller (e.g., remote control device, mouse, trackpad, etc.) of device 102, pressing a particular portion of a touchpad or touchscreen of device 102, making a particular gesture on a touchpad or touchscreen of device 102, and/or making a particular gesture on a controller (e.g., remote control device, mouse, trackpad, etc.) of device 102. User inputs can also be provided via other physical feedback input to device 102, such as tapping any portion of device 102, an action that can be recognized by a motion detection component of device 102 (such as shaking device 102, rotating device 102, etc.), and so forth. User inputs can also be provided in other manners, such as via audible inputs to a microphone, via motions of hands or other body parts observed by an image capture device, and so forth.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Figure 2:
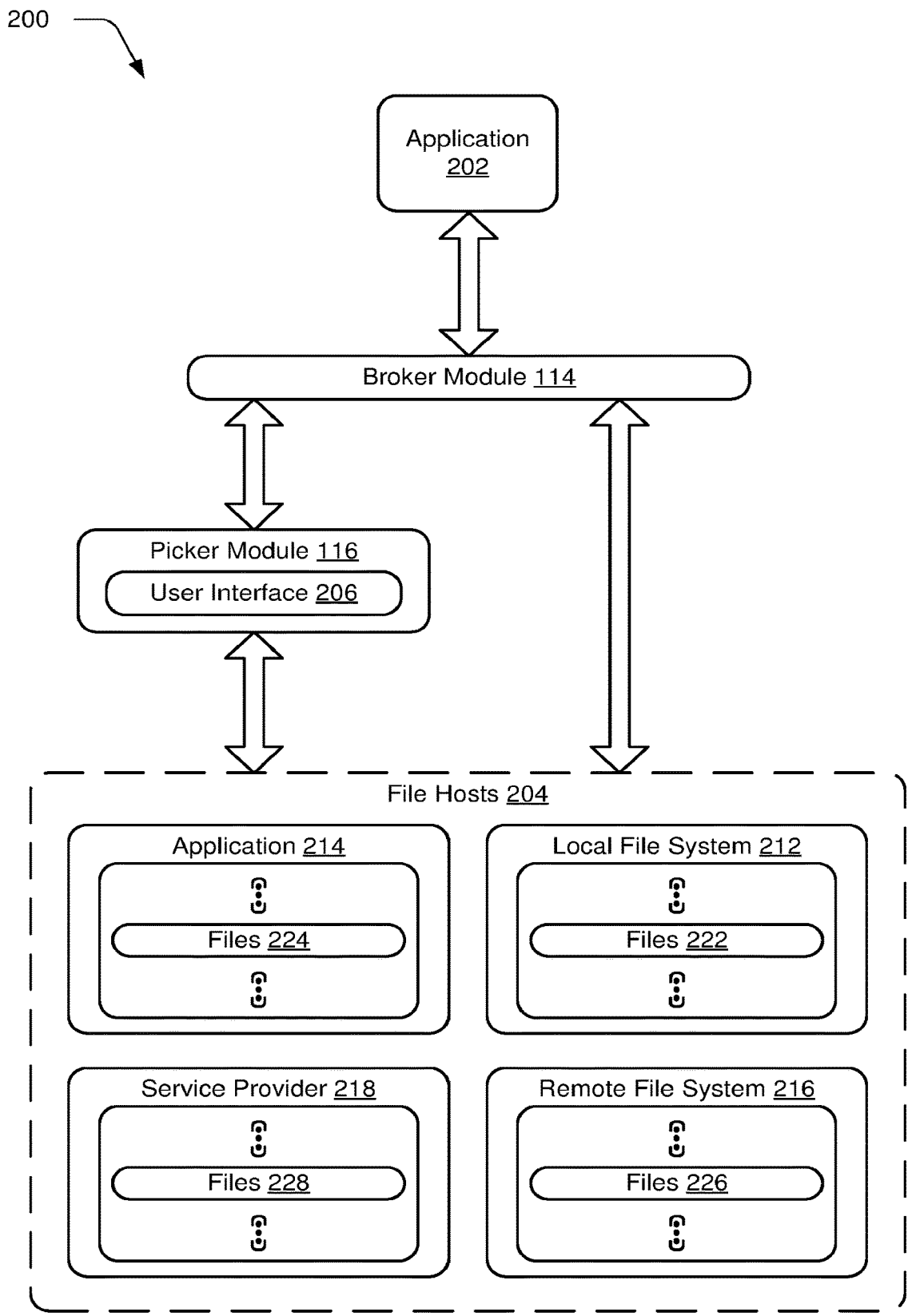
FIG. 2 illustrates another example system implementing the file access with different file hosts techniques discussed herein in accordance with one or more embodiments.

FIG. 2 illustrates an example system 200 implementing the file access with different file hosts techniques discussed herein in accordance with one or more embodiments. System 200 as illustrated may be implemented in part by file management module 106 of computing device 102 of FIG. 1 to perform file management techniques.

System 200 as illustrated includes application 202 (which can be, for example, an application 112 of FIG. 1), a broker module 114, a picker module 116, and one or more file hosts 204. In this example, application 202 communicates with broker module 114 via one or more application programming interfaces (APIs) exposed by broker module 114 to access file hosts 204. Although a single application 202 and particular files hosts 204 are illustrated in FIG. 2, it should be noted that system 200 can include any number of applications 202 accessing any number of file hosts 204.

In one or more embodiments, application 202 is permitted to access file hosts 204 without being aware of where and/or how particular files are arranged, organized, maintained, and so forth by file hosts 204. Application 202, for instance, may be unaware of a namespace or data model used to access files by file hosts 204. Therefore, broker module 114 may convert requests from application 202 received via the APIs into a form that is understandable to locate files of interest.

In other embodiments, application 202 may be made aware of where and/or how files are arranged and located within particular file hosts 204. For instance, application 202 may be configured to use a namespace supported by local file system 212 such that conversion of the request is not performed by broker module 114. A variety of other examples are also contemplated, such as to enable direct access to local file system 212 without interacting with broker module 114 for particular applications (in which case files can be accessed via other user interfaces other than user interface 206 discussed below).

Picker module 116 presents a user interface 206 facilitating user selection of files for retrieval and/or destinations for saving files. User interface 206 allows files to be retrieved from and/or saved to various file hosts. For example, user interface 206 can include a hosted area in which a user interface generated by a file host 204 is displayed.

Broker module 114 and picker module 116 act as intermediaries between application 202 and file hosts 204. Applications 202 may be unaware of file hosts 204, and file hosts may be unaware of application 202. Additionally, user interface 206, including the hosted area in which file hosts 204 can display a portion of the user interface, is provided by picker module 116. Thus, application 202 may be unaware of the particular file host displaying a user interface in the hosted portion at any given time, as well as be unaware of the particular file host 204 from which files are accessed (e.g., which file host 204 files are retrieved from or saved to).

Broker module 114 and/or picker module 116 can communicate with various different file hosts 204, such as local file system 212, application 214, remote file system 216, and service provider 218. Broker module 114 and/or picker module 116 can communicate with file hosts 204 in different manners, and in one or more embodiments modules 114 and/or 116 are configured with (or can otherwise obtain) information indicating how to communicate with each of the file hosts 204.

A file host 204 refers to a system, service, application, and so forth that organizes, manages, and/or stores files. A file host 204 can display a user interface in a hosted area, allowing files of the file host (files that the file host organizes, manages, and/or stores) to be accessed (e.g., retrieved, stored, and so forth). A file host 204 can organize and store files in various different manners using various different data models (the format and/or protocol used in storing files), such as storing files as individual files on a storage device, as files in a database or other record, as part of grouping or collection of files (e.g., as part of a zip or cabinet file), and so forth. Regardless of the data model used by file hosts 204, each file host 204 is aware of how to access (e.g., identify, store, retrieve, modify) the files that that file host 204 organizes, manages, and/or stores.

Local file system 212 is a file host that stores files 222 in one or more folders on local storage devices that are part of or connected to the computing device running application 202, including removable storage devices. Local file system 212 can, for example, store files 222 on local hard disks, optical discs, Flash memory devices, or other computer-readable storage media.

Remote file system 216 is a file host that stores files 226 in one or more folders on a remote storage device that is not the same computing device as is running application 202. For example, the remote storage device can be coupled to the computing device running application 202 via network 104 of FIG. 1. Remote file system 216 can store files on various different computer-readable storage media, analogous to local file system 212.

Application 214 can assume a variety of different configurations, and can be one or more programs, scripts, or other collections of instructions run on various devices, analogous to application 112 of FIG. 1. Application 214 can also be an isolated application, analogous to application 112 of FIG. 1. Application 214 is typically running on the same computing device as application 202, although can alternatively be running on another computing device. Application 214 is a file host that stores files 224 in various manners. Application 214 can leverage local file system 212 and/or remote file system 216 to store files 224, but files 224 are typically accessible only through application 214.

Service provider 218 is one or more applications that can assume a variety of different configurations, providing various services to application 202 such as photo management services, social networking services, messaging or other communication services, document editing services, and so forth. Service provider 218 includes one or more applications that are typically running on one or more different computing devices than application 202, such as on one or more computing devices coupled to the computing device running application 202 via network 104 of FIG. 1. Service provider 218 is a file host that stores files 228 in various manners. Service provider 218 can leverage local file system 212 and/or remote file system 216 to store files 228, but files 228 are typically accessible only through service provider 218.

When application 202 desires to access a file host, such as to allow a user of application 202 to select one or more files for retrieval into application 202 or save one or more files from application 202, application 202 communicates a file access request to broker module 114. Because application 202 is making the file access request, application 202 is also referred to as the calling application. The file access request is communicated, for example, by invoking an API of broker module 114. In response to the file access request, broker module 114 invokes picker module 116, which displays user interface 206. Alternatively, application 202 can bypass broker module 114 and communicate a file access request to picker module 116, invoking picker module 116 directly to display user interface 206 without going through broker module 114.

User interface 206 includes a hosted area, which is a portion of the user interface in which one or more file hosts 204 can display a user interface. The user interface displayed within the hosted area is generated by a file host 204. An application 214 or service provider 218 displaying a user interface within the hosted area can also be referred to as a hosting application. Each file host 204 can tailor the display within the hosted area as that file host 204 desires, optionally modifying and changing that display over time as that file host 204 desires. Application 202 can be unaware of (and have no knowledge of) the manner in which the user interface displayed within the hosted area is generated, the data model or namespace used by the file host 204, and so forth. Similarly, picker module picker module 116 can be unaware of (and have no knowledge of) the manner in which the user interface displayed within the hosted area is generated, the data model or namespace used by the file host 204, and so forth.

Picker module 116 (e.g., UI module 122 of picker module 116) provides the hosted area in which one or more file hosts 204 can display a user interface. The hosted area can be, for example, a window in which the user interface of a file host 204 can be displayed or otherwise presented. The user interface can be displayed within the hosted area in different manners. For example, the user interface to be displayed within the hosted area can be received from a file host 204 and displayed by picker module 116. By way of another example, the file host 204 can be allowed to directly display the user interface in the hosted area (e.g., in a particular window). However, regardless of the manner in which the user interface is displayed within the hosted area, the user interface of the file host is restricted to that host area. The user interface of the file host is not permitted to overwrite other areas of the UI not within the hosted area, and is not permitted to preempt the UI provided by the operating system of the computing device or other applications running on the computing device.

It should be noted that, as picker module 116 provides the hosted area in which one or more file hosts 204 can display a user interface, the hosted area is not provided by a plug-in or extension code incorporated into application 202. In addition to being unaware of (and having no knowledge of) the manner in which the user interface displayed within the hosted area is generated, application 202 can be unaware of the particular file host generating the user interface displayed within the hosted area. The particular file host generating the user interface displayed within the hosted area, as well as the file hosts 204 available to generate the user interface displayed within the hosted area, can change without application 202 being aware of the changes.

User interface 206 can display a single hosted area in which a single file host 204 can display a user interface at a time, and the file host 204 displaying a user interface within the hosted area can change over time. Alternatively, user interface 206 can display multiple hosted areas concurrently, allowing multiple file hosts 204 to display user interfaces concurrently.

Picker module 116 can identify a file host 204 to display a user interface within the hosted area in different manners. In one or more embodiments, identifiers of various file hosts 204 are presented as part of user interface 206, such as in a file host identification portion of user interface 206. A user input selecting one of the identifiers is received, and picker module 116 invokes the file host 204 having the selected identifier to display a user interface within the hosted area. Alternatively, picker module 116 can identify a file host 204 to display a user interface within the hosted area in other manners, such as by identifying a default file host (e.g., that picker module 116 is configured with or can otherwise identify), selecting a file host randomly or according to other rules or criteria, identifying a file host based on a preference or configuration setting received from a user of system 200, and so forth.

The file hosts 204 available in system 200 can be determined in different manners. In one or more embodiments, each file host 204 is registered as being a file host 204 for picker module 116. As part of a registration process, various information regarding file host 204 is provided, such as how to activate the file host 204, file types supported by the file host, and so forth. This registration can be performed at various times, such as when the file host is installed on a computing device implementing picker module 116, when the file host accesses a computing device implementing picker module 116, in response to a user request, and so forth. When determining the file hosts 204 available in system 200 (e.g., and thus the file hosts 204 for which identifiers are to be displayed within a file host identification portion of user interface 206), picker module 116 can identify only those file hosts that have registered as being a file host 204 for picker module 116.

Alternatively, the file hosts 204 available in system 200 can be identified in different manners. For example, a remote service can be accessed (e.g., via network 104 of FIG. 1) to identify services currently accessible by the computing device running application 202, and those identified services can be file hosts 204. By way of another example, a list of file hosts from a vendor or administrator of the computing device running application 202 can be accessed to determine the file hosts 204 available in system 200.

Additionally, in one or more embodiments file hosts 204 can support different file types. A file type refers to a particular type of data stored in the file and/or format in which data is stored in a file. For example, file types can be images files, audio files, video files, text files, and so forth. By way of another example, file types can be JPEG (Joint Photographic Experts Group) files, PDF (Portable Document Format) files, and so forth. A file type being supported by a file host 204 refers to the file host 204 organizing, managing, and/or storing files having that file type. The file types supported by each file host 204 are identified, such as during the registration process discussed above. As part of a file access request, application 202 can identify one or more file types that application 202 desires for that file access request. Picker module 116 identifies (e.g., as file hosts 204 for which identifiers are to be displayed within a file host identification portion of user interface 206) only those file hosts that support the file type requested by application 202. Thus, a file host 204 that does not support a file type requested by application 202 is not identified as a file host that can display a user interface within the hosted area. However, if a subsequent access request from application 202 is received for another file type that is supported by that file host 204, then that file host 204 is identified as a file host that can display a user interface within the hosted area.

When a file host 204 is identified as the file host 204 to display a user interface within the hosted area, the identified file host 204 is activated or otherwise invoked by picker module 116. Picker module 116 is aware of, or can obtain, information indicating how to activate or invoke a file host 204. This information can be obtained, for example, as part of a registration process as discussed above. If the file host 204 is not already running then picker module 116 activates or launches the file host 204, invoking the file host 204 to display a user interface within the hosted area. If the file host 204 is already running, then picker module 116 invokes the file host 204 to display a user interface within the hosted area.

The activated or invoked file host 204 displays the user interface in the hosted area in various manners as determined by the file host 204 itself. Files can be displayed with different representations, such as icons, video sequences, text descriptions, and so forth. Data can be input by a user in different manners, such as via a text entry field, via gestures, audibly, and so forth.

The user interface displayed by the file host 204 in the hosted area can allow various accesses to files managed by the file host 204. For example, the user interface can allow navigating through folders or other groupings of files, selecting one or more files for retrieval, selecting one or more locations for saving a file, and so forth.

In situations in which the file access request from application 202 is requesting to retrieve one or more files, the user interface displayed by the file host 204 identifies (e.g., displays icons or thumbnails representing) one or more files of each of one or more file hosts 204 from which the user of application 202 can select. The selection can be made by the user providing a variety of different inputs as discussed above. Upon selection of one or more files (from one or more file hosts 204), the one or more file hosts 204 provide the selected one or more files (or an indication of where and/or how to retrieve the one or more selected files) to picker module 116. Picker module 116 provides the one or more selected files (or an indication of where and/or how to retrieve the one or more selected files) to broker module 114. Broker module 114 returns to application 202 the one or more selected files (or alternatively an indication of where and/or how application 202 can retrieve the selected one or more files or the content of the one or more files).

In situations in which the file access request from application 202 is requesting to save or store one or more files, the user interface displayed by the file host 204 identifies (e.g., displays icons or thumbnails representing) one or more locations of the file host 204 from which the user of application 202 can select. The user interface displayed by the file host 204 can also provide a user input portion allowing the user to provide various information regarding the one or more files (e.g., names of the one or more files, descriptions of the one or more files). As part of the file access request to save or store a file, application 202 can optionally provide information identifying the file. This information can be provided to the file host 204 displaying the user interface in the hosted area, allowing the file host 204 to incorporate information regarding the file to be saved in the user interface in the hosted area. For example, application 202 can provide to the file host 204 (via broker module 114 and picker module 116) a thumbnail or icon representing the file to be saved. The file host 204 can display this thumbnail or icon as part of the user interface in the hosted area.

Application 202 provides the one or more files to be saved (or an indication of where and/or how to obtain the one or more files to be saved) to broker module 114. Broker module 114 provides the one or more files to be saved (or an indication of where and/or how to obtain the one or more files to be saved) to picker module 116, which provides the one or more files to be saved (or an indication of where and/or how to obtain the one or more files to be saved) to the file host 204 displaying the user interface in the hosted area. Upon receiving a user selection of a location to store the one or more files, the file host 204 displaying the user interface in the hosted area stores the one or more files in the selected location (and optionally with the additional provided information regarding the one or more files). Application 202 can provide the one or more files to be saved (or an indication of where and/or how to obtain the one or more files to be saved) as part of the file access request, or alternatively at other times (e.g., in response to a request for the one or more files from picker module 116, the request provided by picker module 116 in response to a user selection of a location where the one or more files are to be saved).

In system 200, application 202 is a calling application providing access requests to broker module 114, and application 214 is a hosting application that can provide a user interface in a hosted area of user interface 206. However, it should be noted that an application can be a hosting application and/or a calling application at the same and/or different times. For example, application 202 can be a social networking application and application 214 can be a photo editing application. The social networking application can be the hosted application and the photo editing application can be the calling application at one point in time allowing images to be retrieved from the social networking application into the photo editing application, and at a later point in time the photo editing application can be the hosted application and the social networking application can be the calling application allowing images to be retrieved from the photo editing application into the social networking application. Continuing with this example, while the photo editing application is the calling application with respect to the social networking application, a word processing application can be a calling application and the photo editing application can be a host application for the word processing application, thus allowing images to be retrieved from the photo editing application into the word processing application concurrently with allowing images to be retrieved from the social networking application into the photo editing application.

The file access with different file hosts techniques discussed herein support various usage scenarios. For example, while using a particular application, a user is able to request that files of a particular type (e.g., pictures) be retrieved into that one application. Various other applications or service providers that support files of that particular type can be identified and display user interfaces to the user. The user is able to select one or more files from those various other applications, in response to which the selected one or more files are retrieved into the particular application the user is using. The user can thus easily retrieve into the particular application files from another application without having to separately save files from the other application onto a storage device, and then retrieve those saved files into the particular application. Furthermore, the user can retrieve such files from the other application while the particular application into which the files are being retrieved is unaware of the data model used by the other application (and unaware of the other application itself).

Example User Interfaces

The following section describes example user interfaces that may be implemented using the previously described systems and devices. The computing device 102, for instance, may output the user interface 206 through execution of instructions on hardware of the computing device 102, e.g., one or more processors and/or functional blocks that are configured to perform operations by the instructions. Although these techniques are described for output by the user interface 206 of the picker module 116, these techniques may be employed by a wide variety of different user interfaces without departing from the spirit and scope thereof.

Figure 3:
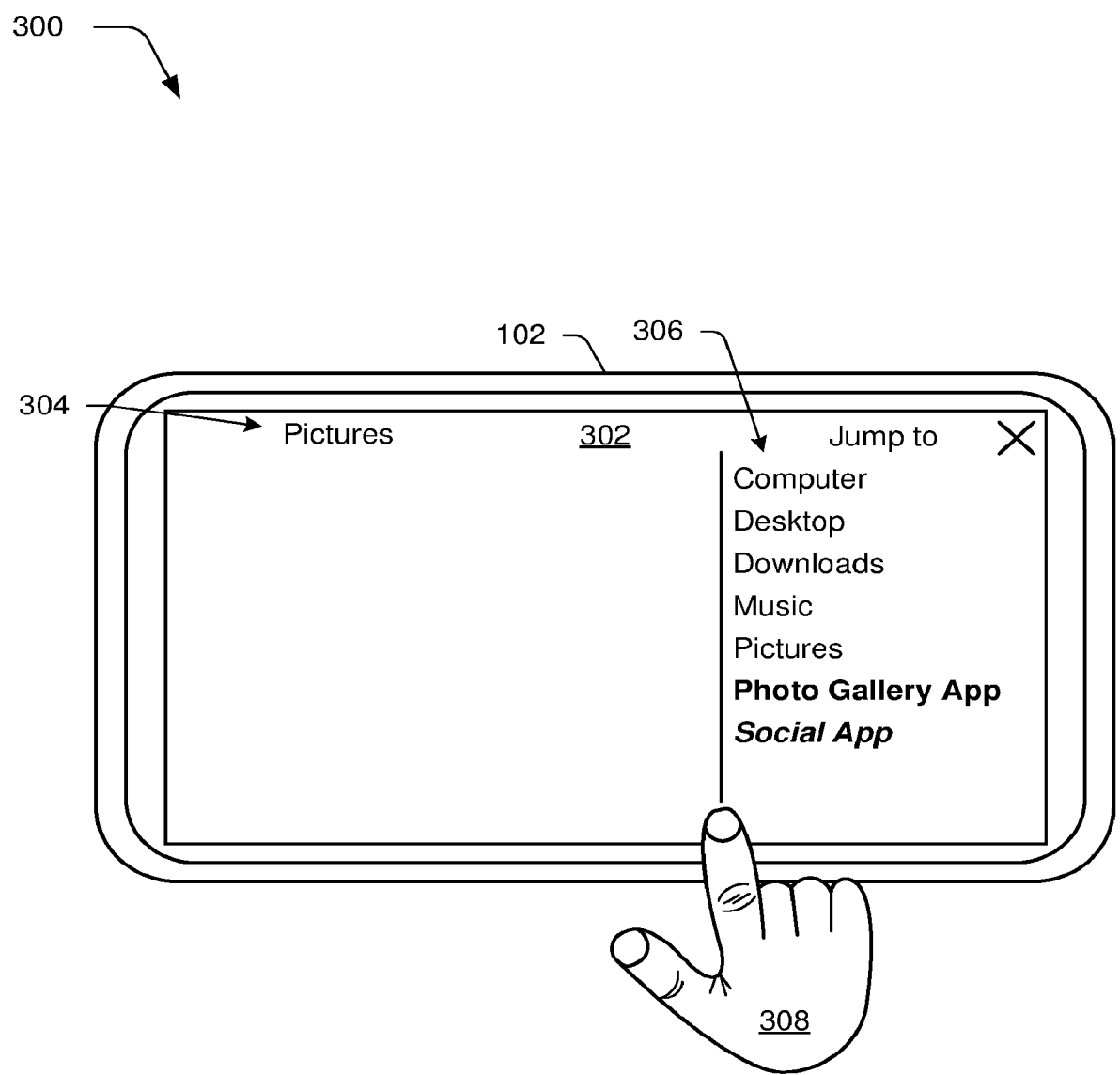
FIGS. 3, 4, 5, and 6 each depict an example user interface displayed using the file access with different hosts techniques discussed herein in accordance with one or more embodiments.

FIG. 3 depicts an example implementation 300 of the computing device 102 of FIG. 1 configured as a mobile communication device and as outputting a user interface 302. User interface 302, as discussed above, may be output to provide access to files of various file hosts 204. Accordingly, user interface 302 may be configured to support navigation through the files of various file hosts 204 in response to user inputs such that the user may manage how this access is performed.

User interface 302 in this example is illustrated as including a navigation portion 304 including an indication that a file access request to open picture types of files has been received. User interface 302 also includes a host identification portion 306, which can be displayed for example in response to user selection of the "jump to" option in navigation portion 304. Host identification portion 306 displays identifiers of various file hosts 204. In the illustrated example, host identification portion 306 displays identifiers of: "Computer", "Desktop", "Downloads", "Music", "Pictures", "Photo Gallery App", and "Social App". The identifiers of "Computer", "Desktop", "Downloads", "Music", "Pictures" can refer to different file hosts or different locations of the same file host (e.g., different folders or libraries in a local file system). The identifier "Photo Gallery App" identifies a file host that is an application (e.g., a photo gallery application), and the identifier "Social App" identifies a file host that is also an application (e.g., a social networking application). The identifiers are listed as text representations, although a variety of other representations are also contemplated, such as images, icons, video sequences, and so forth.

A user can provide inputs via user interface 302 in a variety of different manners as discussed above. For example, a user can use his or her hand 308 to touch and thus select the "jump to" option in navigation portion 304 to have host identification portion 306 displayed, or touch and thus select one of the identifiers in host identification portion 306 to have files of the file host identified by the selected identifier displayed in a hosted area.

Thus, user interface 302 may be output in response to a variety of factors. For example, broker module 114 may receive a file access request from application 112. In response, broker module 114 and/or picker module 116 may output user interface 302. A variety of other examples are also contemplated.

Figure 4:
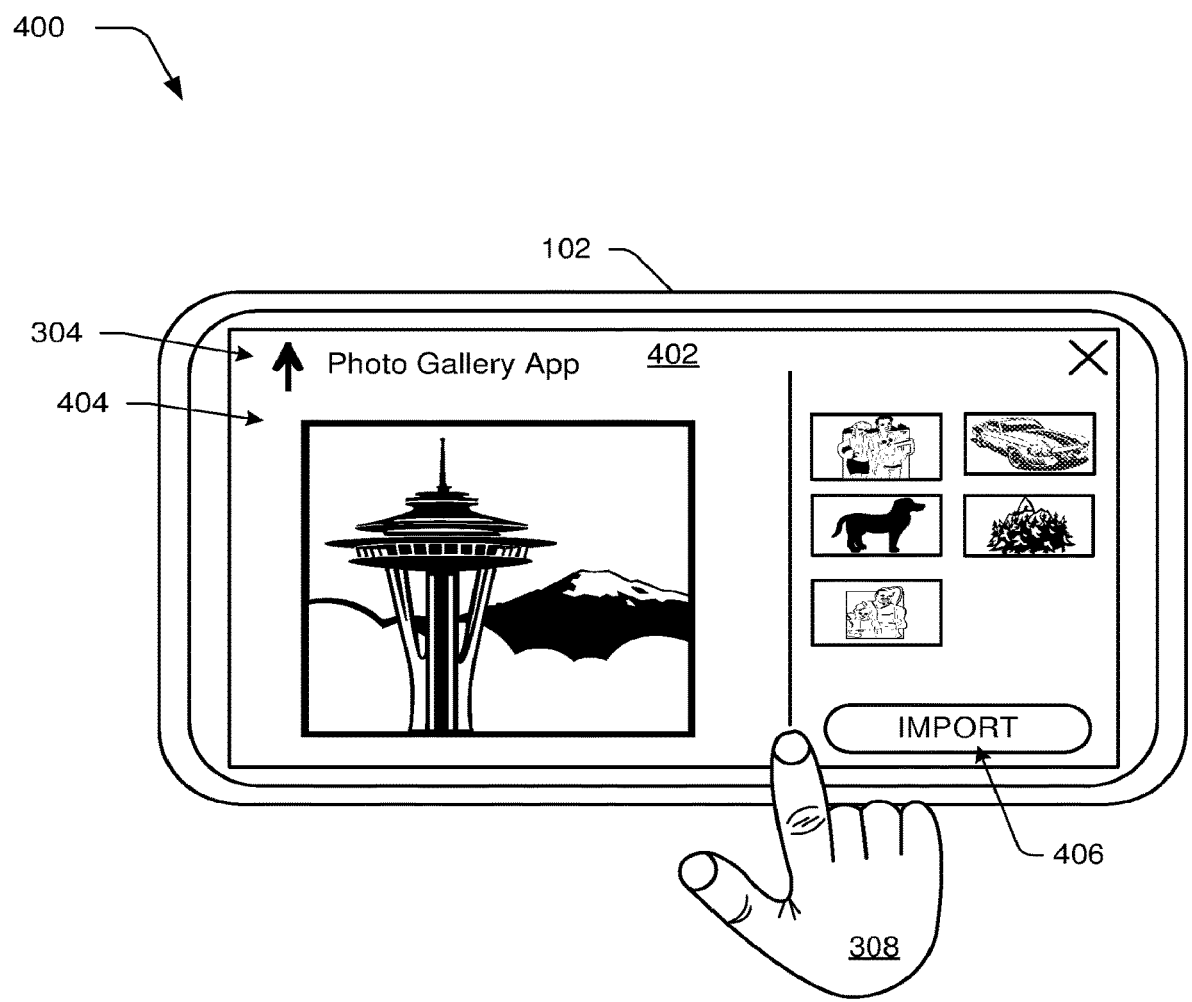

FIG. 4 depicts an example implementation 400 of the computing device 102 of FIG. 1 configured as a mobile communication device and as outputting a user interface 402. User interface 402, as discussed above, may be output to identify files of a file host 204 that can be selected by a user. User interface 402 assumes that the "Photo Gallery App" identifier in host identification portion 306 of user interface 302 was selected. Accordingly, user interface 302 may be configured to support navigation through the files of the photo gallery application in response to user inputs such that the user may manage how this access is performed.

User interface 402 includes a navigation portion 304, illustrating an identifier of the photo gallery application (e.g., "Photo Gallery App") and an up-arrow that can be selected by the user to return to the previous screen (e.g., user interface 302).

User interface 402 also includes a hosted area 404 in which the photo gallery application generates the user interface. In the illustrated example, the photo gallery application generates a user interface having a large image on the left-hand side of hosted area 404, and thumbnails of other images of the photo gallery application on the right-hand side of hosted area 404. A user can select (e.g., by touching with his or her hand 308) a thumbnail on the right-hand side of hosted area 404 to have the selected image displayed as a large image on the left-hand side of hosted area 404. The user can select (e.g., by touching with his or her hand 308) import button 406 to have the file including the large image on the left-hand side of hosted area 404 returned to the calling application. A variety of other user inputs can also be provided to select the large image on the left-hand side of hosted area 404 as representing the file to be returned to the calling application, such as double-clicking or double-tapping the large image, pressing and holding for at least a threshold amount of time a thumbnail of the image, and so forth.

Figure 5:
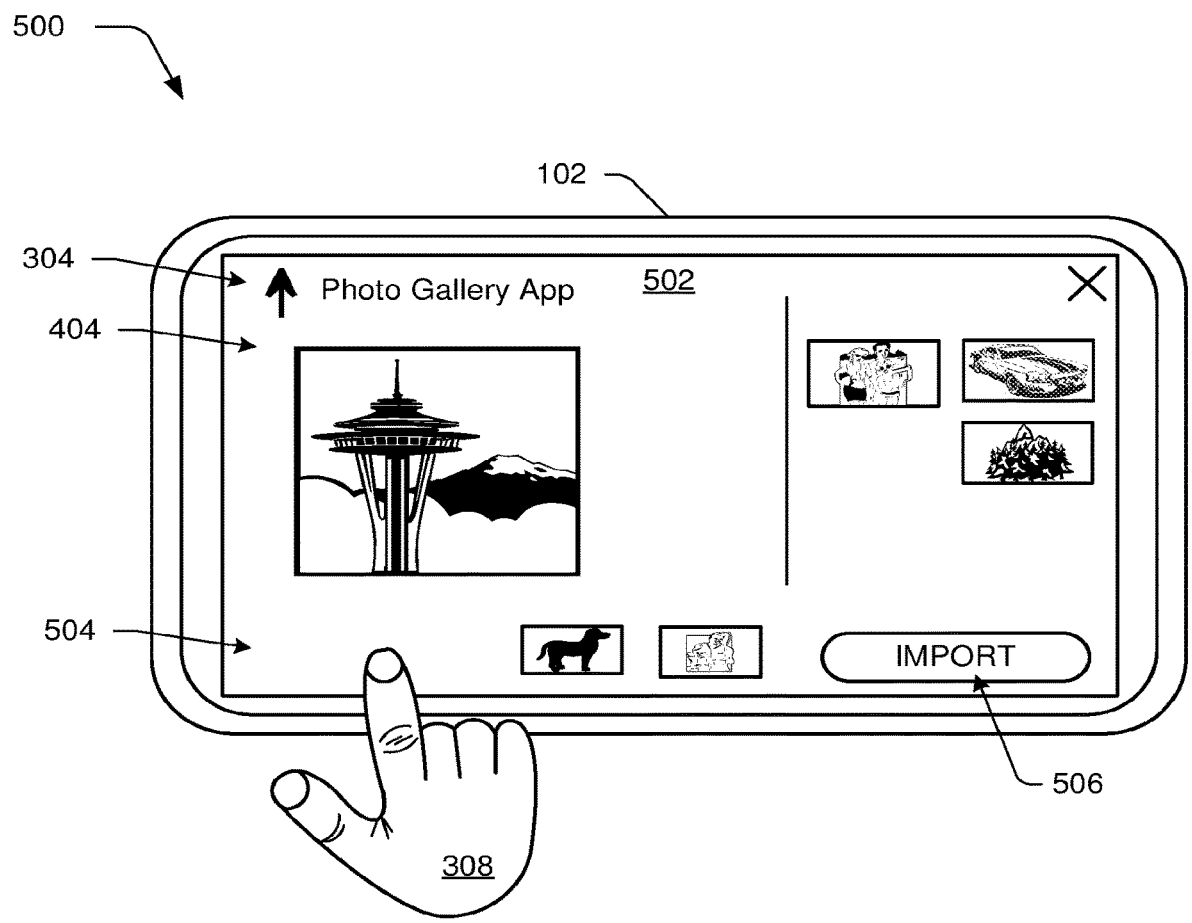

FIG. 5 depicts an example implementation 400 of the computing device 102 of FIG. 1 configured as a mobile communication device and as outputting a user interface 502. User interface 502 is similar to user interface 402, but includes a collection portion 504 that facilitates selecting multiple files from one or more different file hosts. Collection portion 504 can be provided by, for example, picker module 116. Files can be selected in different manners, such as being double-clicked or double-tapped on, being dragged and dropped from the right-hand side of hosted area 404 to collection portion 504, and so forth. As files are selected, thumbnails of the files are displayed in collection portion 504. The user can optionally select files from multiple file hosts, such as by selecting the up-arrow in navigation portion 304 to return to user interface 302. The user can then select an identifier of another file source (e.g., the social networking application represented by "Social App" in host identification portion 306), in response to which the user interface displayed in hosted area 404 is provided by the social networking application. One or more additional files from the social networking application can be selected and added to collection portion 504 (in addition to the thumbnails of the files selected from the photo gallery application already displayed in collection portion 504).

After the user has selected one or more files, the user can select (e.g., by touching with his or her hand 308) import button 506 to have the selected one or more files (whose thumbnails are displayed in collection portion 504) returned to the calling application. A variety of other user inputs can also be provided to have the selected one or more files returned to the calling application.

Figure 6:
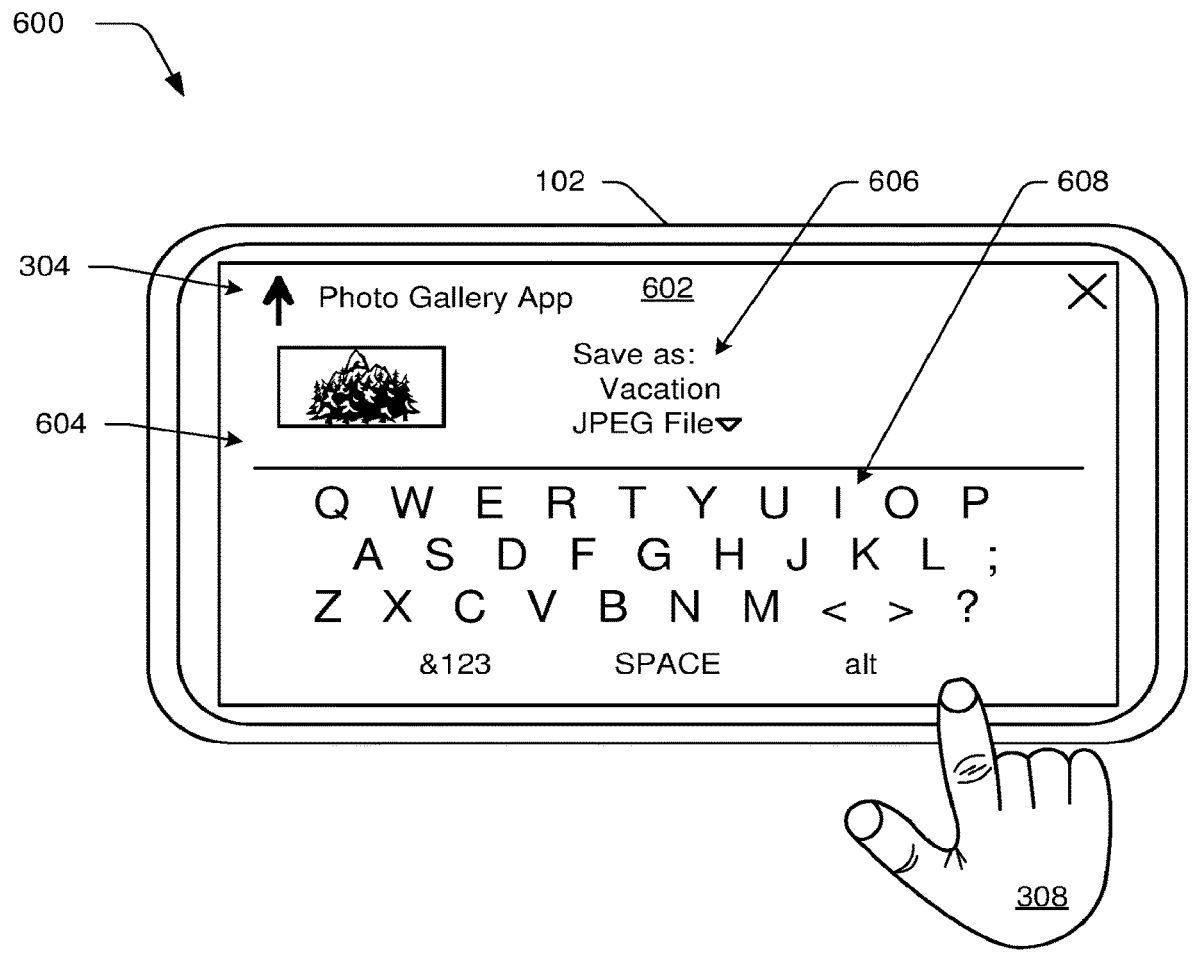

FIG. 6 depicts an example implementation 600 of the computing device 102 of FIG. 1 as displaying a user interface configured to save files to a file host. In this example, a user interface 602 is configured by the computing device 102 to save a file to a photo gallery application file host. The user interface 602 includes a hosted area 604 in which the photo gallery application generates a user interface and that includes a representation of a file, which is an image in this instance. A representation of a mountain is illustrated as being selected to save to the file host.

Hosted area 604 also includes a save portion 606 that is configured to specify information about the file to be saved, which in this instance is a name "Vacation" and a type of file (a JPEG file). A soft keyboard 608 is further displayed as part of hosted area 604, and is configured to receive touch inputs to enter data into save portion 606. In this way, a user may navigate through a user interface, specify a file to be saved, enter information that is to be used to save the file (e.g., the type of the file), and have the file saved through interaction with the user interface 602.

Example Procedures

The following discussion describes file access with different file hosts techniques that may be implemented using the previously described systems and devices. Aspects of each of the procedures may be implemented in hardware, firmware, software, or a combination thereof. The procedures are shown as a set of acts that specify operations performed by one or more devices and are not necessarily limited to the orders shown for performing the operations by the respective acts. In portions of the following discussion, reference will be made to elements of FIGS. 1 and 2.

Figure 7:
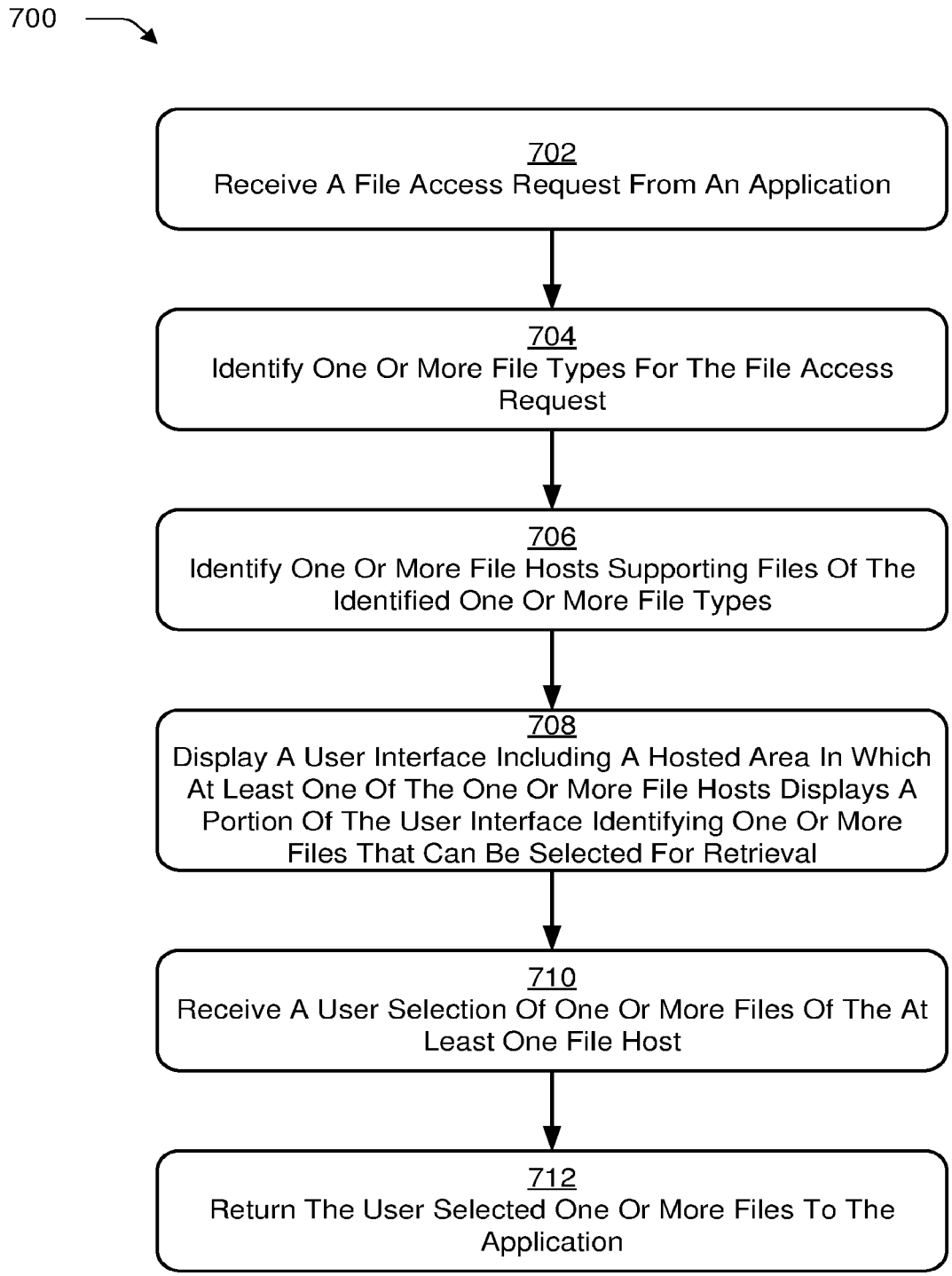
FIG. 7 illustrates an example procedure for implementing the file access with different file hosts in accordance with one or more embodiments.

FIG. 7 illustrates an example procedure 700 for implementing the file access with different file hosts in accordance with one or more embodiments. Procedure 700 is implemented by a file management module, such as file management module 106. In procedure 700, a file access request is received from an application (act 702). The request can be received by the application invoking an API exposed by a broker module of the file management module, as discussed above, and can be a request to retrieve one or more files.

One or more file types for the file access request are identified (act 704). These one or more file types can be identified as part of the file access request, as discussed above. These one or more file types are typically the types of files for which the application is requesting retrieval.

One or more file hosts supporting files of the identified one or more file types are identified (act 706). These one or more file hosts can be various types of file hosts as discussed above, such as other applications. The file types supported by the file hosts can be identified in different manners, such as during a registration process as discussed above.

A user interface including a hosted area is displayed (act 708). Within the hosted area, at least one of the one or more file hosts displays a portion of the user interface identifying one or more files that can be selected for retrieval. The file host displaying a portion of the user interface can change as discussed above. Additionally, as discussed above, the application can be unaware of which file host is displaying the user interface in the hosted area, and the file host can tailor the user interface in the hosted area as that file host desires.

A user selection of one or more files of the at least one file host is received (act 710). A user selection of one or more files from each of one or more of the file hosts can be received as discussed above.

The user selected one or more files are returned to the application (act 712). As discussed above, the application can be unaware of from which of the one or more file hosts the one or more files are selected.

Figure 8:
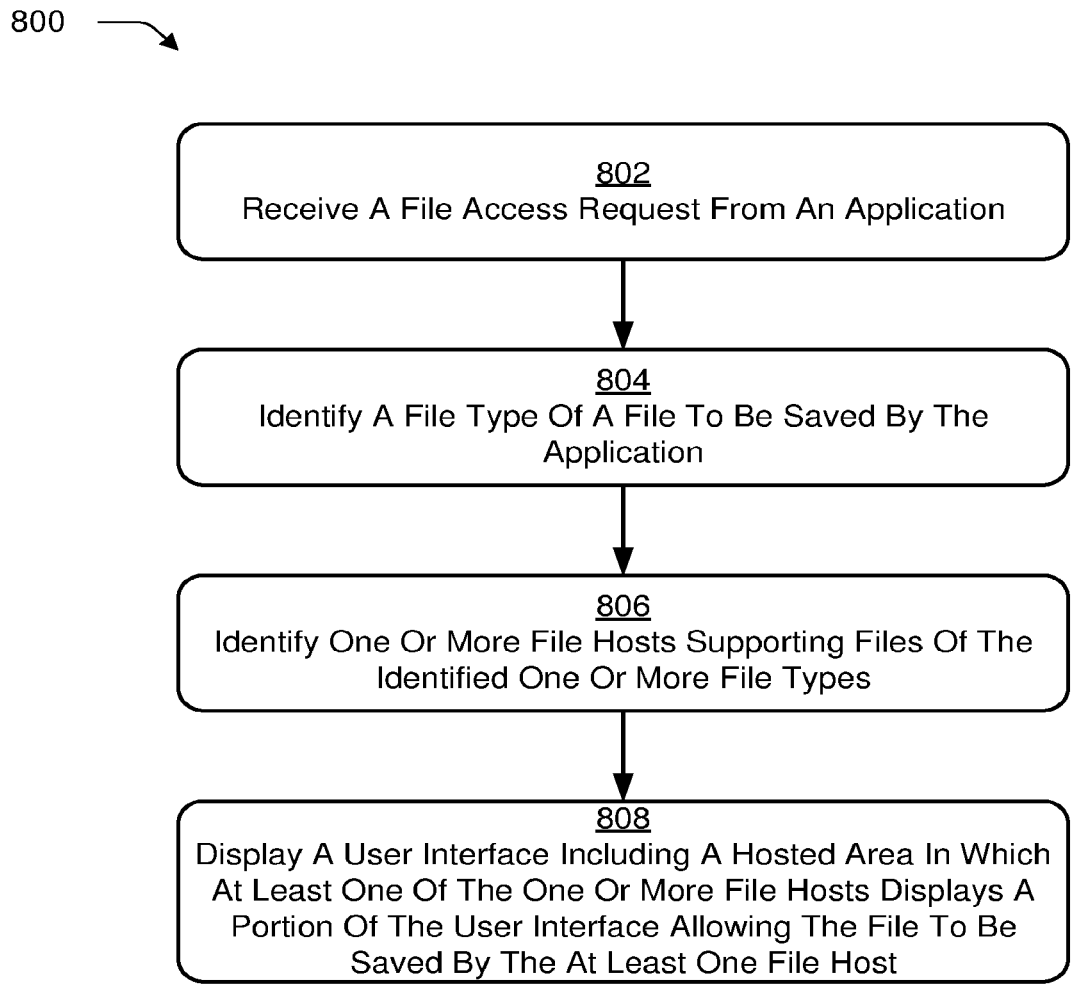
FIG. 8 illustrates another example procedure for implementing the file access with different file hosts in accordance with one or more embodiments.

FIG. 8 illustrates another example procedure 800 for implementing the file access with different file hosts in accordance with one or more embodiments. Procedure 800 is implemented by a file management module, such as file management module 106. In procedure 800, a file access request is received from an application (act 802). The request can be received by the application invoking an API exposed by a broker module of the file management module, as discussed above, and can be a request to save one or more files.

A file type of a file to be saved by the application is identified (act 804). This file type can be identified in different manners, such as being included as part of the file access request, being provided by a user input, being inherent in the file (e.g., identified by an extension that is part of the name of the file, identified as metadata associated with the file), and so forth.

One or more file hosts supporting files of the identified file type are identified (act 806). These one or more file hosts can be various types of file hosts as discussed above, such as other applications. The file types supported by the file hosts can be identified in different manners, such as during a registration process as discussed above.

A user interface including a hosted area is displayed (act 808). Within the hosted area, at least one of the one or more file hosts displays a portion of the user interface allowing the file to be saved by the at least one file host. The location where the file is to be saved can be selected by the user via the user interface displayed in the hosted area, as discussed above. The file host displaying a portion of the user interface can change as discussed above. Additionally, as discussed above, the application can be unaware of which file host is displaying the user interface in the hosted area, and the file host can tailor the user interface in the hosted area as that file host desires.

CONCLUSION

Various actions such as communicating, receiving, sending, storing, generating, obtaining, and so forth performed by various modules are discussed herein. It should be noted that the various modules can cause such actions to be performed. A particular module causing an action to be performed includes that particular module itself performing the action, or alternatively that particular module invoking or otherwise accessing another component or module that performs the action (or performs the action in conjunction with that particular module).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   a processor; and
   a computer-readable storage medium storing computer instructions which, when executed, cause the processor to:
   receive, from an application running on the computing device and via an application programming interface (API), a request to access files stored by a remote service provider, wherein the request to access files comprises identification of a file type of files for which access is requested;
   display a user interface having a hosted area on the computing device;
   invoke the remote service provider to present user interface elements in the hosted area of the user interface, wherein the user interface elements represent individual files stored by the remote service provider that match the request, wherein the remote service provider is restricted to displaying the user interface elements for the individual files within the hosted area;

receive a file selection, via the hosted area of the displayed user interface, of one or more of the user interface elements corresponding to one or more selected files stored by the remote service provider that match the request; and provide the one or more selected files to the application, wherein the application is enabled to modify content of the one or more selected files via user input received at the application.

2. The computing device of claim 1, wherein the computer instructions, when executed, cause the processor to:
display, on the user interface, a file host identification portion identifying a plurality of file hosts, including the remote service provider, that support the file type of files for which access is requested.

3. The computing device of claim 2, wherein the computer instructions, when executed, cause the processor to:
receive a file host selection via the file host identification portion, the file host selection identifying the remote service provider.

4. The computing device of claim 3, wherein the file type comprises image files, and each of the plurality of file hosts identified in the file host identification portion supports image files.

5. The computing device of claim 3, wherein the file type comprises a particular image file format, and each of the plurality of file hosts identified in the file host identification portion supports the particular image file format.

6. The computing device of claim 1, wherein the computer instructions, when executed, cause the processor to:
prevent the remote service provider from overwriting other areas of the user interface outside of the hosted area.

7. The computing device of claim 1, wherein the computer instructions, when executed, cause the processor to:
prevent the remote service provider from preempting other applications running on the computing device.

8. A method comprising:
receiving, from an application executing on a computing device and via an application programming interface (API), a request to access files that identifies a file type of files for which access is requested;
providing a user interface having a hosted area for display on the computing device;
invoking a remote service provider that supports the file type to present user interface elements in the hosted area of the user interface, wherein the user interface elements represent individual files stored by the remote service provider that match the request;
receiving a file selection, via the hosted area of the user interface, of one or more of the user interface elements corresponding to one or more selected files stored by the remote service provider that match the request; and
providing the one or more selected files to the application, wherein the application is enabled to modify content of the one or more selected files via user input received at the application.

9. The method of claim 8, further comprising:
performing a registration process with a plurality of file hosts to obtain registration information identifying different file types supported by different file hosts.

10. The method of claim 9, further comprising:
responsive to the request, outputting identifiers of at least two different file hosts, including the remote service provider, having corresponding registration information indicating support for the file type.

11. The method of claim 8, further comprising:
outputting a collection portion of the user interface; and
adding individual user interface elements to the collection portion as they are selected via the hosted area of the user interface.

12. The method of claim 11, further comprising:
importing multiple selected files to the application, the multiple selected files corresponding to the individual user interface elements added to the collection portion.

13. The method of claim 12, wherein the individual user interface elements comprise thumbnails.

14. The method of claim 8, performed entirely by the computing device on which the application executes.

15. A computing device comprising:
a processor; and
a computer-readable storage medium storing computer instructions which, when executed, cause the processor to implement an operating system configured to:
receive, from an application on the computing device and via an application programming interface (API), a request to access files stored by a remote service provider, wherein the request to access files comprises identification of a file type of files for which access is requested;
display a user interface having a hosted area on the computing device;
invoke the remote service provider to present user interface elements in the hosted area of the user interface, wherein the user interface elements represent individual files stored by the remote service provider that match the request;
receive a file selection, via the hosted area of the displayed user interface, of one or more of the user interface elements corresponding to one or more selected files stored by the remote service provider that match the request; and
provide the one or more selected files to the application, wherein the application is enabled to modify content of the one or more selected files via user input received at the application.

16. The computing device of claim 15, wherein the operating system is further configured to isolate the application by preventing the application from accessing certain resources on the computing device.

17. The computing device of claim 16, wherein the operating system is further configured to isolate the application by running the application in a sandbox.

18. The computing device of claim 15, wherein the operating system is further configured to register the remote service provider as providing support for the file type.

19. The computing device of claim 15, wherein the operating system is further configured to prevent the remote service provider from overwriting other areas of the user interface outside of the hosted area.

20. The computing device of claim 15, wherein the operating system is further configured to prevent the remote service provider from preempting other applications running on the computing device.

* * * * *